(12) United States Patent
Park (10) Patent No.: US 10,814,910 B2
(45) Date of Patent: Oct. 27, 2020

(54) STEERING WHEEL VIBRATION REDUCTION APPARATUS AND STEERING WHEEL VIBRATION REDUCTION METHOD THEREOF

(71) Applicant: Mando Corporation, Pyeongtaek-si, Gyeonggi-do (KR)

(72) Inventor: SeongHoon Park, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 16/550,954

(22) Filed: Aug. 26, 2019

(65) Prior Publication Data

US 2020/0062304 A1   Feb. 27, 2020

(30) Foreign Application Priority Data

Aug. 27, 2018 (KR) .................. 10-2018-0100215

(51) Int. Cl.
*B62D 7/22* (2006.01)
*F16F 7/00* (2006.01)

(52) U.S. Cl.
CPC ............... *B62D 7/222* (2013.01); *F16F 7/00* (2013.01)

(58) Field of Classification Search
CPC .................................. B62D 7/222; F16F 7/00
See application file for complete search history.

(56) References Cited

U.S. PATENT DOCUMENTS

| 6,262,547 | B1* | 7/2001 | Kifuku | B62D 5/046 180/443 |
| 8,164,284 | B2* | 4/2012 | Ura | B62D 5/0403 318/400.01 |
| 2008/0035411 | A1* | 2/2008 | Yamashita | B62D 5/046 180/443 |
| 2010/0217487 | A1* | 8/2010 | Murakami | B62D 5/0463 701/42 |
| 2016/0280252 | A1* | 9/2016 | Tagami | B62D 3/12 |
| 2020/0062304 | A1* | 2/2020 | Park | B62D 7/222 |

* cited by examiner

*Primary Examiner* — Vicky A Johnson
(74) *Attorney, Agent, or Firm* — Hauptman Ham, LLP (57) ABSTRACT

The present disclosure provides a steering wheel vibration reduction apparatus including: a vibration torque signal detector that detects a vibration torque signal according to a torque generated in accordance with vibrations of a steering wheel; a wheel frequency recognizer that detects a frequency of the vibration torque signal and, if the frequency corresponds to a wheel frequency condition set in advance and recognizes the frequency as the wheel frequency; and a vibration reduction torque signal generator that generates a vibration reduction torque signal using the wheel frequency and controls the motor such that a torque for reducing the vibrations of the steering wheel is generated by the motor and a steering wheel vibration reduction method.

17 Claims, 7 Drawing Sheets

STEERING WHEEL VIBRATION REDUCTION APPARATUS AND STEERING WHEEL VIBRATION REDUCTION METHOD THEREOF

CROSS-REFERENCE TO RELATED APPLICATION

This application claims priority from Korean Patent Application No. 10-2018-0100215, filed on Aug. 27, 2018, which is hereby incorporated by reference for all purposes as if fully set forth herein.

BACKGROUND OF THE INVENTION

Field of the Invention

The present disclosure relates to a steering wheel vibration reduction apparatus and a steering wheel vibration reduction method thereof.

Description of Related Art

Vibrations may be generated in a steering apparatus for a vehicle due to various reasons. For example, vibrations may be generated in a steering apparatus for a vehicle due to impacts applied to wheels of the vehicle, side wear of the wheels of the vehicle, and the like.

Particularly, vibrations generated in a steering wheel included in a steering apparatus for a vehicle lower a degree of silence of the vehicle cabin and reduce a steering sense felt by a driver. Thus, reduction apparatuses for reducing vibrations generated in the steering wheel have been developed.

Generally, in order to detect the frequency of vibrations generated in a steering wheel, a reduction apparatus determines the frequency using a rotation speed of wheels and a radius of the wheels.

However, if external environment factors such as the air pressure of the wheels and the temperatures of the inside and the outside of the vehicle change, the frequency determined by the reduction apparatus does not correspond to the frequency of vibrations generated in the steering wheel.

Accordingly, if the external environment factors change, the reduction apparatus cannot accurately detect the frequency of vibrations generated in the steering wheel and cannot efficiently reduce the vibrations generated in the steering wheel.

SUMMARY OF THE INVENTION

In such a background, an object of the present disclosure is to provide a steering wheel vibration reduction apparatus and a steering wheel vibration reduction method capable of minimizing vibrations generated in a steering wheel that change frequently in accordance with external environment factors.

Another object of the present disclosure is to provide a steering wheel vibration reduction apparatus and a steering wheel vibration reduction method that accurately detect vibrations generated in a steering wheel by using a torque generated in the steering wheel and performs efficient control for compensating for the vibrations.

In order to achieve the object described above, in one aspect, the present disclosure provides a steering wheel vibration reduction apparatus including: a vibration torque signal detector that detects a vibration torque signal according to a torque generated in accordance with vibrations of a steering wheel among torques generated in the steering wheel; a wheel frequency recognizer that detects a frequency of the vibration torque signal and, if the frequency corresponds to a wheel frequency condition set in advance and recognizes the frequency as the wheel frequency; and a vibration reduction torque signal generator that generates a vibration reduction torque signal using the wheel frequency and controls the motor such that a torque for reducing the vibrations of the steering wheel is generated by the motor.

In another aspect, the present disclosure provides a steering wheel vibration reduction method including: detecting a vibration torque signal according to a torque generated in accordance with vibrations of a steering wheel among torques generated in the steering wheel; detecting a frequency of the vibration torque signal and, if the frequency corresponds to a wheel frequency condition set in advance and recognizing the frequency as the wheel frequency; and generating a vibration reduction torque signal using the wheel frequency and controlling the motor such that a torque for reducing the vibrations of the steering wheel is generated by the motor.

As described above, according to the present disclosure, a steering wheel vibration reduction apparatus and a steering wheel vibration reduction method capable of minimizing vibrations generated in a steering wheel that change frequently in accordance with external environment factors can be provided.

In addition, according to the present disclosure, a steering wheel vibration reduction apparatus and a steering wheel vibration reduction method that accurately detect vibrations generated in a steering wheel by using a torque generated in the steering wheel and performs efficient control for compensating for the vibrations can be provided.

DETAILED DESCRIPTION OF THE INVENTION

In the following description of examples or embodiments of the present disclosure, reference will be made to the accompanying drawings in which it is shown by way of illustration specific examples or embodiments that can be implemented. such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

Figure 1:
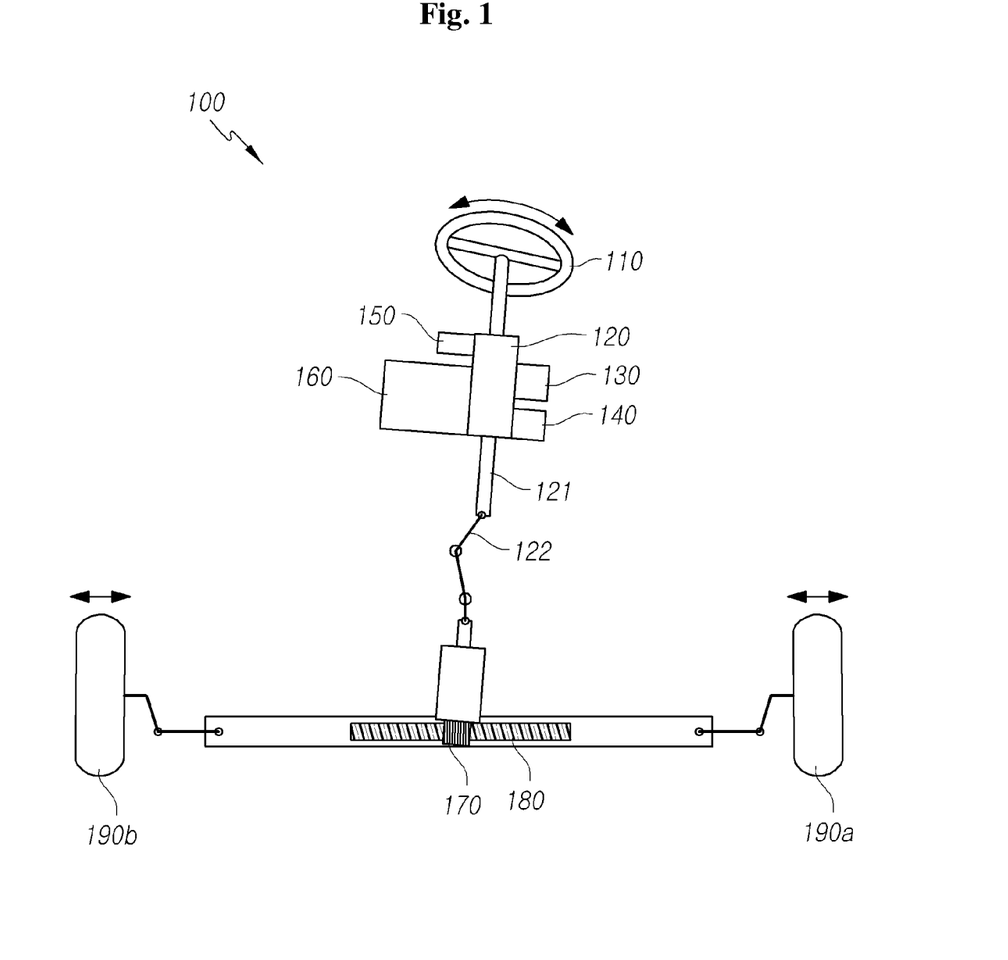
FIG. 1 is a diagram schematically illustrating a steering apparatus according to the present disclosure.

FIG. 1 is a diagram schematically illustrating a steering apparatus 100 according to the present disclosure.

Referring to FIG. 1, the steering apparatus 100 according to the present disclosure may include a steering wheel 110, a steering column 120, a torque sensor 130, a reaction motor 140, a wheel-speed sensor 150, a steering wheel vibration reduction apparatus 160, a drive motor 170, a rack bar 180, wheels 190, and the like.

The steering apparatus 100 according to the present disclosure may be either a mechanical steering apparatus in which a force generated by a driver holding and rotating the steering wheel 110 is transmitted to the drive motor 170 and the rack bar 180 or an actuator of the wheels 190 and the like through a mechanical power transmission apparatus, and the wheels 190 are steered or a steer-by-wire steering apparatus in which a mechanical power transmission apparatus is eliminated.

The mechanical steering apparatus is frequently used as an electronic steering apparatus (electronic power steering (EPS)) in which an auxiliary apparatus is added such that a driver can steer the vehicle more easily.

In the EPS, there are a hydraulic type in which a vehicle is steered by generating a hydraulic pressure by rotating a pump and a motor-driven steering apparatus that steers a vehicle using a motor.

Hereinafter, for the convenience of description, the steering apparatus 100 according to the present disclosure represents a mechanical steering apparatus. However, the steering apparatus is not limited thereto.

The steering wheel 110 is a component that is directly held and controlled by a driver for controlling steering of the vehicle.

The steering column 120 represents a shaft connected such that the wheels 190 are operated in accordance with the steering of the steering wheel 110. The steering wheel 110 is coupled with a first shaft 121 of the steering column 120, and the drive motor 170 is coupled with a second shaft 122 of the steering column 120.

The torque sensor 130 is a sensor that detects a torque according to the rotation of the steering wheel 110, a reactive torque according to driving of the reaction motor 140, and the like.

The reaction motor 140 is a motor that generates a reactive torque such that a reactive sense is provided for a driver for a torque generated in accordance with the rotation of the steering wheel 110.

The wheel-speed sensor 150 is a sensor that detects a rotation speed of the wheels 190.

Although not illustrated in the drawing, the steering apparatus 100 according to the present disclosure may include an acceleration sensor, a yaw rate sensor, and the like in addition to the torque sensor 130 and the wheel-speed sensor 150.

The steering wheel vibration reduction apparatus 160 is an apparatus for minimizing vibrations generated in the steering wheel 110. Detailed description thereof will be presented later.

The drive motor 170 is a motor that assists steering of a vehicle when the vehicle is steered by a driver operating the steering wheel 110.

A pinion gear (not illustrated) included in the drive motor 170 and the rack bar 180 are engaged with each other and are coupled.

Although not illustrated in the drawing, the steering apparatus 100 according to the present disclosure may further include an electronic control unit (ECU) for controlling various sensors, motors, and the like.

The components included the steering apparatus 100 according to the present disclosure may use a communication system between apparatuses of the vehicle for exchanging signals.

For example, as the communication system between apparatuses of the vehicle, a controller area network (CAN) may be used.

An operation for steering the vehicle using the steering apparatus 100 according to the present disclosure is as follows. First, if a driver holds and rotates the steering wheel 110, the steering column 120 coupled with the steering wheel 110 rotates. The drive motor 170 is driven in accordance with the rotation of the steering column 120 and the control of the ECU. If the pinion gear rotates in accordance with the driving of the drive motor 170, the rack bar 180 engaged with the pinion gear linearly moves, and the wheels 190 coupled with a tie rod (not illustrated) and a knuckle arm (not illustrated) operate to the left side or the right side.

In the steering apparatus 100 according to the present disclosure, the steering wheel 110 and the wheels 190 are mechanically coupled using the steering column 120 and the rack bar 180. Accordingly, when an impact is applied to the wheels 190, vibrations of the wheels 190 are transmitted to the steering wheel 110.

Thus, when a driver travels with the steering wheel 110 held, if an obstacle or the like collides with the wheels 190, and vibrations of the wheels 190 are generated, the driver feels a steering sense less and is not provided with convenience in traveling.

In order to solve such problems, the present disclosure provides a steering wheel vibration reduction apparatus 160 capable of minimizing vibrations of the steering wheel 110.

Figure 2:
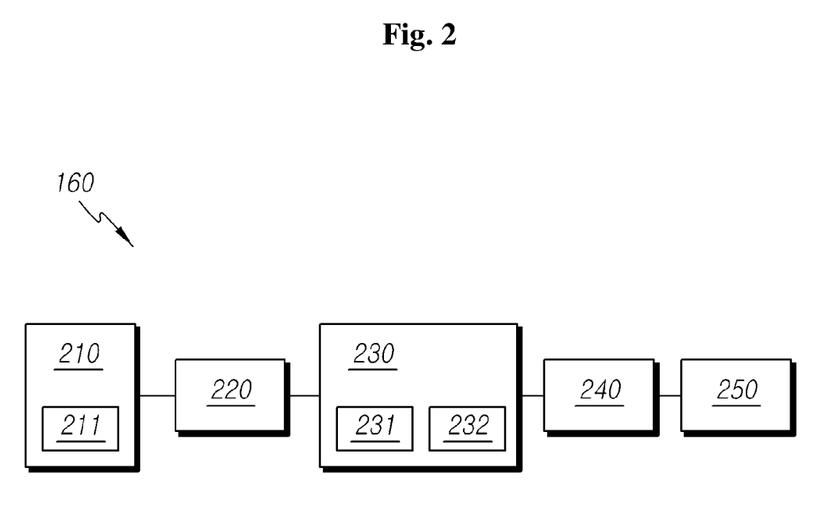
FIG. 2 is a diagram illustrating the configuration of a steering wheel vibration reduction apparatus according to the present disclosure.

FIG. 2 is a diagram illustrating the configuration of the steering wheel vibration reduction apparatus 160 according to the present disclosure.

Referring to FIGS. 1 and 2, the steering wheel vibration reduction apparatus 160 according to the present disclosure may include a vibration torque signal detector 210, a wheel frequency recognizer 220, a vibration reduction torque signal generator, and the like.

The vibration torque signal detector 210 may detect a vibration torque signal according to a torque generated in accordance with vibrations of the steering wheel 110 among torques generated in the steering wheel 110.

Here, as the torques generated in the steering wheel 110, there may be a torque generated in accordance with a driver holding and rotating the steering wheel 110, a reactive torque generated by the reaction motor 140, a torque generated in accordance with transmission of vibrations of the wheel 190 caused by external disturbances to the steering wheel 110, and the like.

Here, the vibration torque signal detector 210 may include a variable filter 211. The variable filter 211 is a device used for extracting a frequency corresponding to a variable threshold range among input frequencies. Details of a specific operation of the variable filter 211 will be described later with reference to FIG. 4.

The wheel frequency recognizer 220 detects a frequency of a vibration torque signal and, in a case in which the frequency corresponds to a wheel frequency condition set in advance, may recognize the frequency as a wheel frequency.

Here, there are various methods for detecting a frequency of a vibration torque signal using the wheel frequency recognizer 220.

For example, after sampling a vibration torque signal at predetermined intervals over a sufficiently long time, the wheel frequency recognizer 220 may detect a frequency using a difference between two or more times at which characteristics of the vibration torque signal are similar. A specific detection method will be described later with reference to FIGS. 5 and 6.

Here, a wheel frequency represents a frequency of a signal for offsetting the vibration torque signal.

Here, a wheel frequency condition is a condition set for determining accuracy of the frequency detected from the vibration torque signal. The wheel frequency condition may be a variable condition based on input information input from the outside.

The wheel frequency condition may be a condition including an error allowance range generated using a simulation, an algorithm according to software or a condition including an error allowance range acquired by determining a theoretical value using an numerical expression and reflecting a specific coefficient in the determined theoretical value. However, the wheel frequency condition is not limited thereto.

The wheel frequency recognizer 220 may output a wheel frequency to the vibration torque signal detector 210 and the vibration reduction torque signal generator 230.

At this time, in a case in which the vibration torque signal detector 210 includes the variable filter 211, the variable filter 211 may receive an input of a wheel frequency from the wheel frequency recognizer 220 and set a wheel frequency range based on the wheel frequency.

The variable filter 211 can pass vibration torque signals included in the wheel frequency range.

Here, the variable filter 211 may be a band pass filter or a high pass filter.

The wheel frequency range may be a predetermined threshold range having an upper limit value and a lower limit value with the wheel frequency positioned at the center or a range having the wheel frequency as a lower limit value and including all the frequencies higher than the wheel frequency.

For example, in a case in which the variable filter 211 is a band pass filter, the wheel frequency range may be a frequency range having a predetermined bandwidth with the wheel frequency set as a center frequency.

At this time, if the wheel frequency increases, the bandwidth may increase in accordance with the increased wheel frequency. To the contrary, if the wheel frequency that is a center frequency decreases, the bandwidth may decrease in accordance with the decreased wheel frequency. Preferably, there may be a proportional relation between the bandwidth and the wheel frequency. However, the relation therebetween is not limited thereto.

As another example, in a case in which the variable filter 211 is a high pass filter, the wheel frequency range may be a frequency range having the wheel frequency as a cutoff frequency.

The vibration reduction torque signal generator 230 may control the motor by generating a vibration reduction torque signal using the wheel frequency such that a torque reducing the vibrations of the steering wheel 110 is generated by the motor. Here, the motor represents the reaction motor 140 illustrated in FIG. 1.

As one example, the vibration reduction torque signal generator 230 generates a vibration reduction torque signal using the wheel frequency and outputs the vibration reduction torque signal to the motor. At this time, the motor receives an input of the vibration reduction torque signal and generates a torque for reducing vibrations of the steering wheel 110.

The vibration reduction torque signal represents a signal generated such that it offsets the vibration torque signal. In other words, the vibration reduction torque signal may be a signal having a phase opposite to that of the vibration torque signal.

The vibration reduction torque signal may correspond to an AC current applied to the reaction motor 140 such that a vibration reduction torque reducing a vibration torque generated in accordance with vibrations of the steering wheel 110 is generated.

Here, the vibration reduction torque signal generator 230 may include a reference signal generator 231 and an adaptive filter 232.

The reference signal generator 231 may receive an input of a wheel frequency and generate a reference signal.

The adaptive filter 232 may receive an input of a reference signal and generate a vibration reduction torque signal.

Here, the adaptive filter 232 may receive a feedback of an error value determined using the vibration torque signal and the vibration reduction torque signal and update coefficients.

The adaptive filter 232 may update coefficients until the error value decreases to be equal to or smaller than a reference value. The reference value may be a value set in advance in consideration of the traveling state of the vehicle, the performance of the vehicle, and the like. As one example, the reference value may be "0" or a value approaching "0".

Here, the steering wheel vibration reduction apparatus 160 according to the present disclosure may further include a reference frequency determiner 240.

The reference frequency determiner 240 may provide input information required for the wheel frequency recognizer 220 to specifically determine the wheel frequency condition.

As one example, the wheel frequency recognizer 220 may receive an input of a reference frequency, set a valid frequency range having a predetermined range based on the reference frequency in advance, and recognize a frequency as a wheel frequency based on whether the frequency is included in the valid frequency range set in advance.

The reference frequency determiner 240 may receive an input of information relating to a wheel speed of a vehicle and determine a reference frequency.

The reference frequency determiner 240 may output the determined reference frequency to the wheel frequency recognizer 220.

The information relating to a wheel speed of a vehicle may be information acquired by the wheel-speed sensor 150 detecting a rotation speed of the wheels 190.

The reference frequency is a frequency that is theoretically determined using a rotation speed of the wheels 190 and a radius of the wheels 190, and the like. As one example, the reference frequency may be determined using a numerical expression as below.

$$V \times \frac{1000 \ [m]}{2 \times \pi \times R \times 60 \ [min] \times 60 \ [sec]} [Hz] \quad \text{[Numerical Expression]}$$

In the numerical expression described above, V represents a rotation speed of the wheels 190, and R represents a radius of the wheels 190.

In order for the vibration reduction torque signal generator 230 to receive a feedback of an error value, the steering wheel vibration reduction apparatus 160 according to the present disclosure may further includes a feedbacker 250.

The feedbacker 250 may feedback an error value determined using a vibration torque signal and a vibration reduction torque signal to the vibration reduction torque signal generator 230.

More specifically, the feedbacker 250 receives inputs of a vibration torque signal detected by the vibration torque signal detector 210 and a vibration reduction torque signal generated by the vibration reduction torque signal generator 230. The feedbacker 250 determines an error value by summing the two signals that have been input. The feedbacker 250 feeds back the determined error value to the vibration reduction torque signal generator 230.

At this time, the vibration reduction torque signal generator 230 may generate a vibration reduction torque signal until the error value that has been fed back decreases to be equal to or smaller than a reference value set in advance. Here, the reference value is "0" or a value approaching "0".

Hereinafter, a specific method of operating the steering wheel vibration reduction apparatus 160 according to the present disclosure and the reaction motor 140 will be described more specifically with reference to a block diagram.

Figure 3:
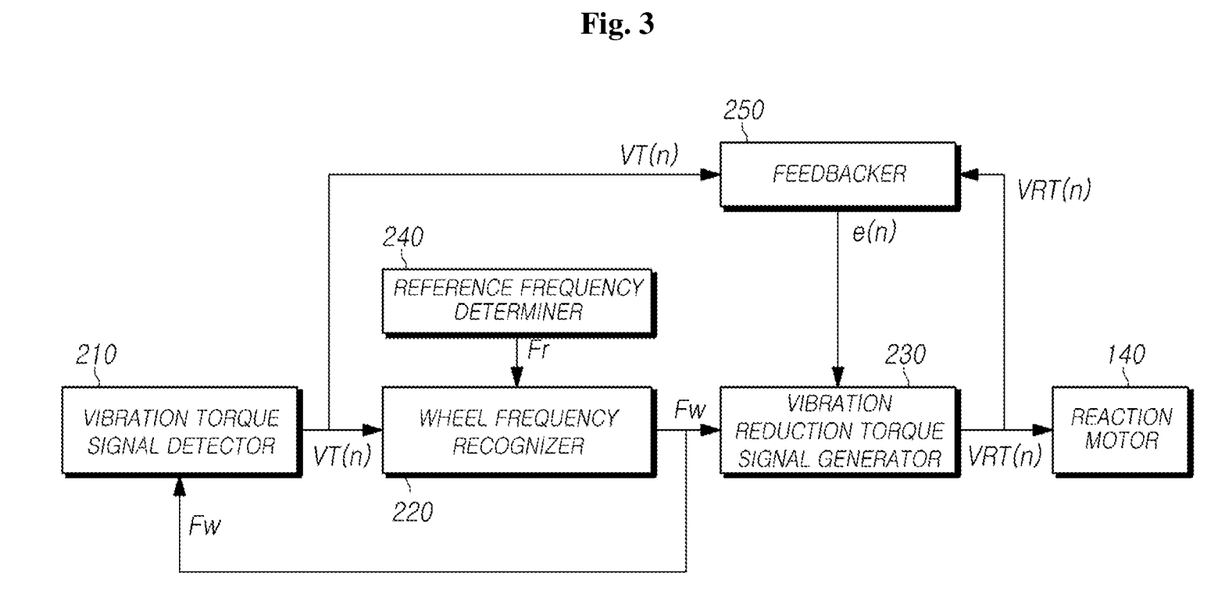
FIG. 3 is a block diagram illustrating a steering wheel vibration reduction apparatus and a reaction motor according to one embodiment of the present disclosure.

FIG. 3 is a block diagram illustrating the steering wheel vibration reduction apparatus 160 and the reaction motor 140 according to one embodiment of the present disclosure.

Referring to FIGS. 1 and 3, if an external disturbance is applied to a vehicle, and vibrations are generated in the wheels 190 in a steering direction, vibrations and a torque according to the vibrations are generated in the steering wheel 110.

The vibration torque signal detector 210 detects a vibration torque signal VT(n) among torques generated in the steering wheel 110. The vibration torque signal detector 210 outputs the detected vibration torque signal VT(n) to the wheel frequency recognizer 220 and the feedbacker 250.

In a case in which the frequency of the vibration torque signal VT(n) that has been input corresponds to a wheel frequency condition, the wheel frequency recognizer 220 recognizes the frequency as a wheel frequency Fw and outputs the recognized wheel frequency Fw to the vibration torque signal detector 210 and the vibration reduction torque signal generator 230.

The vibration torque signal detector 210 may set a wheel frequency range based on the input wheel frequency Fw and detect a frequency of a vibration torque signal included in the wheel frequency range.

Meanwhile, the wheel frequency recognizer 220 receives an input of a reference frequency Fr that is determined by the reference frequency determiner 240 and may set the wheel frequency condition more specifically.

The reference frequency determiner 240 may determine the reference frequency Fr by substituting the rotation speed of the wheels 190 detected by the wheel speed sensor 150 and the radius of the wheels 190 in the numerical expression described above.

The vibration reduction torque signal generator 230 may generate a vibration reduction torque signal VRT(n) based on the input wheel frequency Fw and output the generated vibration reduction torque signal VRT(n) to the feedbacker 250 and the reaction motor 140.

The feedbacker 250 feeds back an error value e(n) acquired by summing the vibration torque signal VT(n) and the vibration reduction torque signal VRT(n) that have been input to the vibration reduction torque signal generator 230.

The vibration reduction torque signal generator 230 generates a vibration reduction torque signal VRT(n) until the error value e(n) that has been fed back decreases to be equal to or smaller than the reference value set in advance and outputs the generated vibration reduction torque signal VRT(n) to the feedbacker 250 and the reaction motor 140.

When the vibration reduction torque signal VRT(n) is received by the reaction motor 140, the reaction motor 140 is driven to generate a vibration reduction torque.

The steering wheel vibration reduction apparatus 160 according to the present disclosure can operate using the reference signal generator 231 and the adaptive filter 232 included in the vibration reduction torque signal generator 230.

Figure 4:
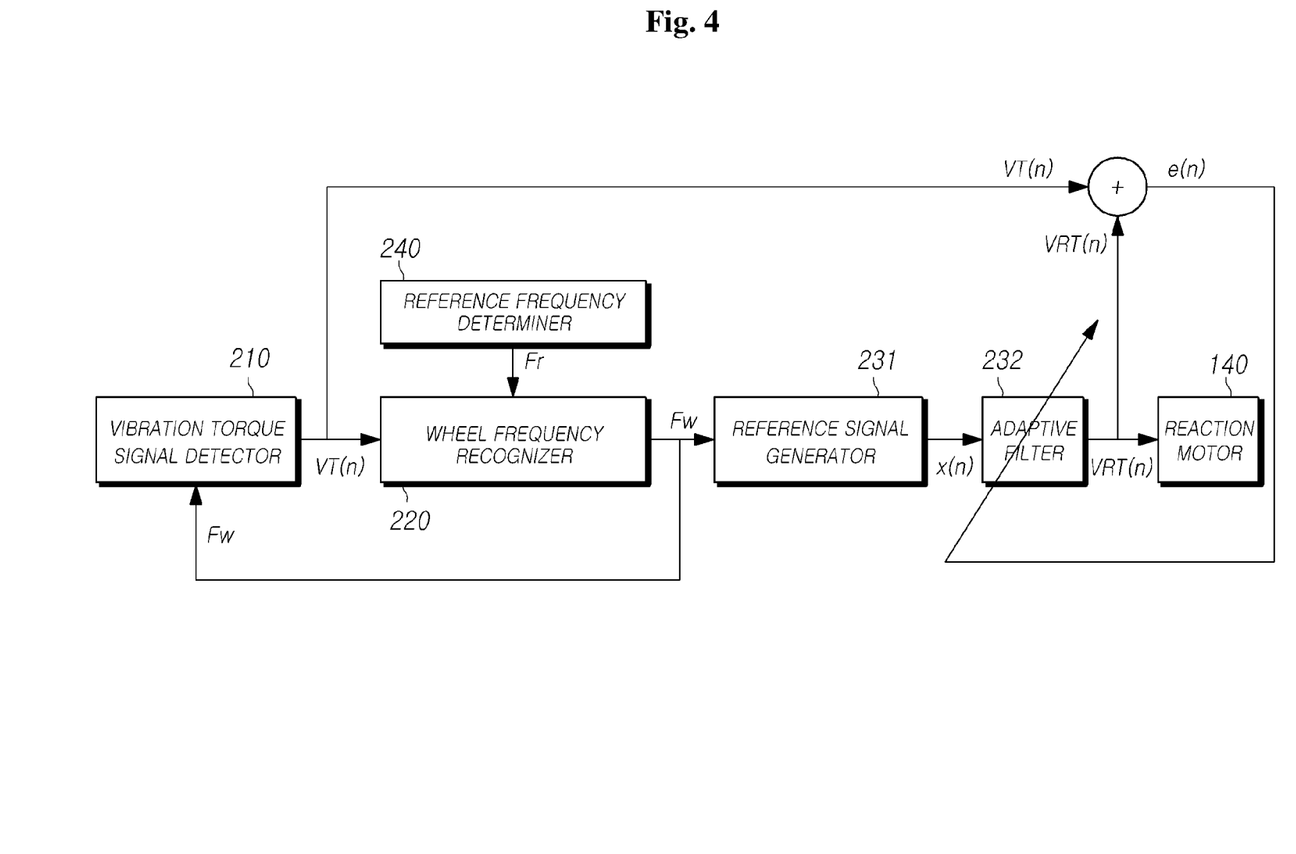
FIG. 4 is a block diagram illustrating a steering wheel vibration reduction apparatus and a reaction motor according to another embodiment of the present disclosure.

FIG. 4 is a block diagram illustrating a steering wheel vibration reduction apparatus 160 and a reaction motor 140 according to another embodiment of the present disclosure.

Referring to FIGS. 1 and 4, if an external disturbance is applied to wheels 190, vibrations are generated in the wheels 190 are generated in the steering wheel 110, and a torque is generated in accordance with the vibrations in the steering wheel 110.

The vibration torque signal detector 210 detects a vibration torque signal VT(n) among torques generated in the steering wheel 110 and outputs the detected vibration torque signal VT(n) to the wheel frequency recognizer 220.

The wheel frequency recognizer 220 recognizes a wheel frequency Fw using the input vibration torque signal VT(n) and outputs the recognized wheel frequency Fw to the vibration torque signal detector 210 and the reference signal generator 231.

Meanwhile, the vibration torque signal detector 210 may receive a feedback of the wheel frequency Fw and detect a frequency of the vibration torque signal VT(n) included in wheel frequency range set based on the wheel frequency Fw.

The reference signal generator 231 receives an input of the wheel frequency Fw, generates a reference signal x(n), and outputs the generated reference signal to the adaptive filter 232.

The adaptive filter 232 receives an input of the reference signal x(n), generates a vibration reduction torque signal VRT(n), and outputs the generated vibration reduction torque signal VRT(n) to the reaction motor 140.

On the other hand, the adaptive filter 232 receives a feedback of an error value e(n) acquired by summing the output vibration reduction torque signal VRT(n) and the vibration torque signal VT(n) and updates coefficients until the error value e(n) that has been fed back becomes "0" (or a value approaching "0").

When the vibration reduction torque signal VRT(n) is received by the reaction motor 140, the reaction motor 140 is driven to generate a vibration reduction torque.

Hereinafter, a method of recognizing a wheel frequency Fw using the input vibration torque signal VT(n) using the wheel frequency recognizer 220 will be described more specifically with reference to FIGS. 5 and 6.

Figure 5:
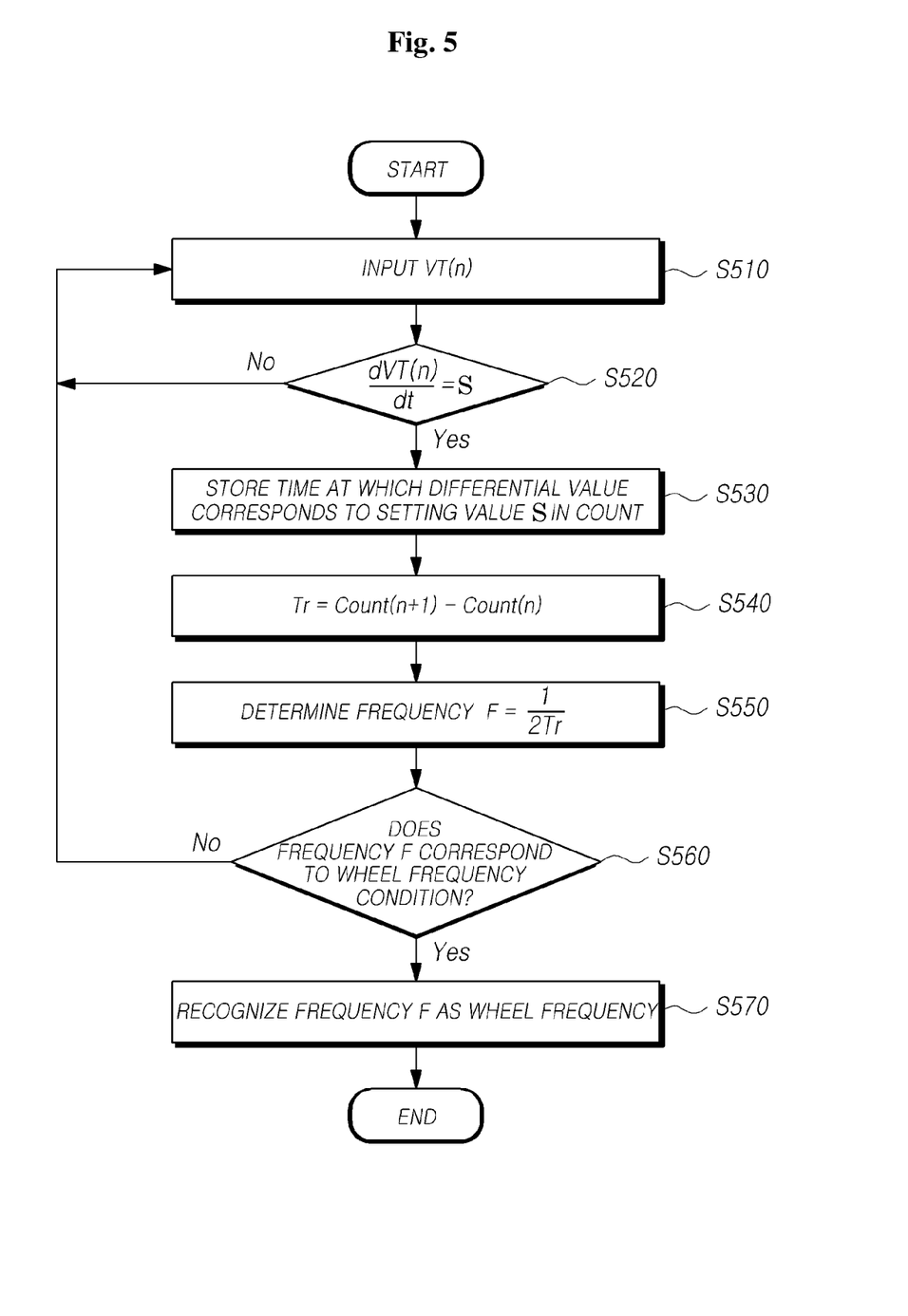
FIG. 5 is a diagram illustrating a method of operating a wheel frequency recognizer included in a steering wheel vibration reduction apparatus according to one embodiment of the present disclosure.

FIG. 5 is a diagram illustrating a method of operating the wheel frequency recognizer 220 included in the steering wheel vibration reduction apparatus 160 according to one embodiment of the present disclosure.

Referring to FIGS. 2 and 5, the wheel frequency recognizer 220 receives an input of the vibration torque signal VT(n) detected by the vibration torque signal detector 210 (S510).

Here, the vibration torque signal VT(n) may be a signal sampled at predetermined intervals for a continuous signal or a sufficiently long time.

The wheel frequency recognizer 220 determines whether or not a change rate of the vibration torque signal VT(n) according to the time, in other words, a differential value $$\frac{dVT(n)}{dt}$$

of the vibration torque signal corresponds to a setting value S set in advance (S520).

Here, the setting value S set in advance may be set to any arbitrary value. Preferably, the setting value S may be "0" or a value approaching "0".

As one example, in a case in which the setting value S is set to "0" in advance, the wheel frequency recognizer 220 determines whether a differential value $$\frac{dVT(n)}{dt}$$

of the continuous vibration torque signal corresponds to "0".

As another example, in a case in which the setting value S is set to a value approaching "0", the wheel frequency recognizer 220 determines whether a differential value $$\frac{dVT(n)}{dt}$$

of the sampled vibration torque signal corresponds to the setting value S.

If the differential value $$\frac{dVT(n)}{dt}$$

of the vibration torque signal corresponds to the setting value S set in advance, the wheel frequency recognizer 220 stores a time when the differential value $$\frac{dVT(n)}{dt}$$

of the vibration torque signal corresponds to the setting value S set in advance in Count (S530).

There may be at least two times when the differential value $$\frac{dVT(n)}{dt}$$

of the vibration torque signal corresponds to the setting value S set in advance.

Here, Count represents a memory used for storing a time.

For example, the wheel frequency recognizer 220 sets the setting value S to a value approaching "0" in advance. The wheel frequency recognizer 220 determines times at which the differential value $$\frac{dVT(n)}{dt}$$

of the sampled vibration torque signal corresponds to the setting value S. Here, it is assumed that the number of determined times is two for the convenience of description. However, the number thereof is not limited thereto.

A determined time may be a time when the sampled vibration torque signal VT(n) has a value approaching a maximum value or a time when the sampled vibration torque signal has a value approaching a minimum value. In other words, a first time among the determined times is a time when the sampled vibration torque signal VT(n) has a value approaching a maximum value, and a second time among the determined times is a time when the sampled vibration torque signal VT(n) has a value approaching a minimum value.

The wheel frequency recognizer 220 stores the determined first time in Count(1) and stores the determined second time in Count(2).

The wheel frequency recognizer 220 determines a difference value Tr using the times stored in Count (S540).

For example, for Count(1) in which a first time is stored and Count(2) in which a second time, which is a time after the first time, is stored, the wheel frequency recognizer 220 determines a difference value Tr(Count(2)−Count(1)) between Count(1) and Count(2).

The wheel frequency recognizer 220 determines a frequency F using the difference value Tr (S550).

For example, the wheel frequency recognizer 220 determines a period by multiplying Tr by 2 and determines a frequency F by determining a reciprocal of the period.

In this way, the wheel frequency recognizer 220 may detect a frequency F using two or more times at which the differential value $$\frac{dVT(n)}{dt}$$

of the vibration torque signal becomes the setting value S set in advance.

When the frequency F is determined, the wheel frequency recognizer 220 determines whether or not the frequency F corresponds to the wheel frequency condition (S560).

If the frequency F corresponds to the wheel frequency condition, the wheel frequency recognizer 220 recognizes the frequency F as a wheel frequency (S570).

Figure 6:
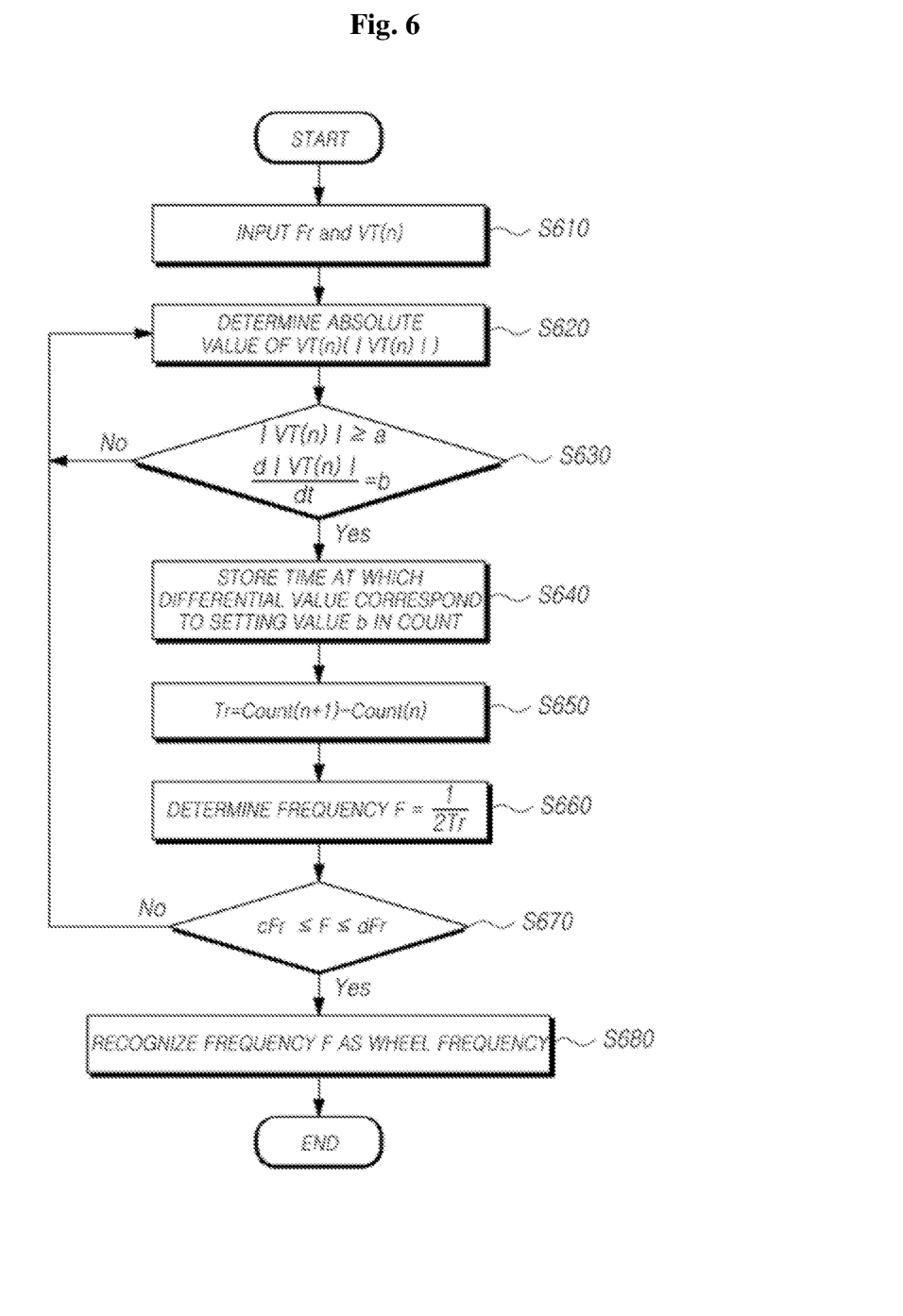
FIG. 6 is a diagram illustrating a method of operating a wheel frequency recognizer included in a steering wheel vibration reduction apparatus according to another embodiment of the present disclosure.

FIG. 6 is a diagram illustrating a method of operating a wheel frequency recognizer 220 included in a steering wheel vibration reduction apparatus 160 according to another embodiment of the present disclosure.

Referring to FIGS. 2 and 6, the wheel frequency recognizer 220 receives inputs of the reference frequency Fr determined by the reference frequency determiner 240 and the vibration torque signal VT(n) detected by the vibration torque signal detector 210 (S610).

Here, the vibration torque signal VT(n) may be a signal sampled at predetermined intervals for a continuous signal or a sufficiently long time.

The wheel frequency recognizer 220 determines an absolute value |VT(n)| of the input vibration torque signal (S620).

According to another embodiment in which the process (S620) described above is added, compared to the embodiment illustrated in FIG. 5, a simple determination process and accurate determined result values can be acquired.

The wheel frequency recognizer 220 determines whether the absolute value |VT(n)| of the vibration torque signal is equal to or larger than a first setting value a set in advance and a differential value $$\frac{d|VT(n)|}{dt}$$

of the absolute value of the vibration torque signal corresponds to a second setting value b set in advance (S630).

Here, the first setting value a is a value corresponding to the sensitivity of a driver to vibrations of the steering wheel 110.

The reason for using the absolute value |VT(n)| of the vibration torque signal that is equal to or larger than the first setting value a is that the compensation efficiency of the steering wheel vibration reduction apparatus 160 according to the present disclosure may decrease.

Accordingly, by extracting the vibration torque signal VT(n) (or the absolute value |VT(n)| of the vibration torque signal) that is equal to or larger than the first setting value a set in advance using the wheel frequency recognizer 220, the steering wheel vibration reduction apparatus 160 can efficiently compensate for the vibration torque signal VT(n) (or the absolute value |VT(n)| of the vibration torque signal).

Here, the second setting value b may be the same as the setting value S described above with reference to FIG. 5. Accordingly, the second setting value b may be "0" or a value approaching "0".

If the absolute value |VT(n)| of the vibration torque signal is equal to or larger than the first setting value a set in advance, and the differential value $$\frac{d|VT(n)|}{dt}$$

of the absolute value of the vibration torque signal corresponds to the second setting value b set in advance, the wheel frequency recognizer 220 stores a time when the differential value $$\frac{d|VT(n)|}{dt}$$

of the absolute value of the vibration torque signal corresponds to a setting value set in advance, for example, the second setting value b in Count (S640).

There may be at least two times when the differential value $$\frac{dVT(n)}{dt}$$

of absolute value of the vibration torque signal corresponds to the second setting value b, and Count represents a memory used for storing a time.

For example, the wheel frequency recognizer 220 sets the second setting value b to a value approaching "0" in advance. The wheel frequency recognizer 220 determines times at which the differential value $$\frac{dVT(n)}{dt}$$

of the absolute value of the sampled vibration torque signal corresponds to the second setting value b. Here, it is assumed that the number of determined times is two for the convenience of description. However, the number thereof is not limited thereto.

A determined time may be a time when the absolute value |VT(n)| of the sampled vibration torque signal VT(n) has a value approaching a maximum value. In other words, the first time and the second time may be times when the absolute value |VT(n)| of the sampled vibration torque signal VT(n) has a value approaching the maximum value.

The wheel frequency recognizer 220 stores the determined first time in Count(1) and stores the determined second time in Count(2).

The wheel frequency recognizer 220 determines a difference value Tr using the times stored in Count (S650) and, the wheel frequency recognizer 220 determines a frequency F using the difference value Tr (S660).

When the frequency F is determined, the wheel frequency recognizer 220 determines whether or not the frequency F is included in the valid frequency range set in advance (S670).

Here, the valid frequency range represents a wheel frequency condition determined in consideration of environment conditions corresponding to a traveling environment of the vehicle, an air pressure of the wheels 190, and a temperature of the outside.

The valid frequency range may be set to have a predetermined range based on the reference frequency Fr that has been input.

For example, the valid frequency range may be set to have a lower limit value determined by multiplying the input reference frequency Fr by a first coefficient c and an upper limit value determined by multiplying the input reference frequency Fr by a second coefficient d. At this time, the first coefficient c may be in the range of 0 to 1, and the second coefficient d may be in the range of 1 to 2. However, the coefficients are not limited thereto.

If the frequency F does not correspond to the valid frequency range, the wheel frequency recognizer 220 determines an absolute value of the input vibration torque signal VT(n) again (S620).

Although not illustrated in the drawing, the wheel frequency recognizer 220 may receive an input of the vibration torque signal VT(n) again (S610).

If the frequency F corresponds to the valid frequency range, the wheel frequency recognizer 220 recognizes the frequency F as a wheel frequency (S680).

A steering wheel vibration reduction method that can perform all the disclosures described above will be briefly described with reference to FIG. 7.

Figure 7:
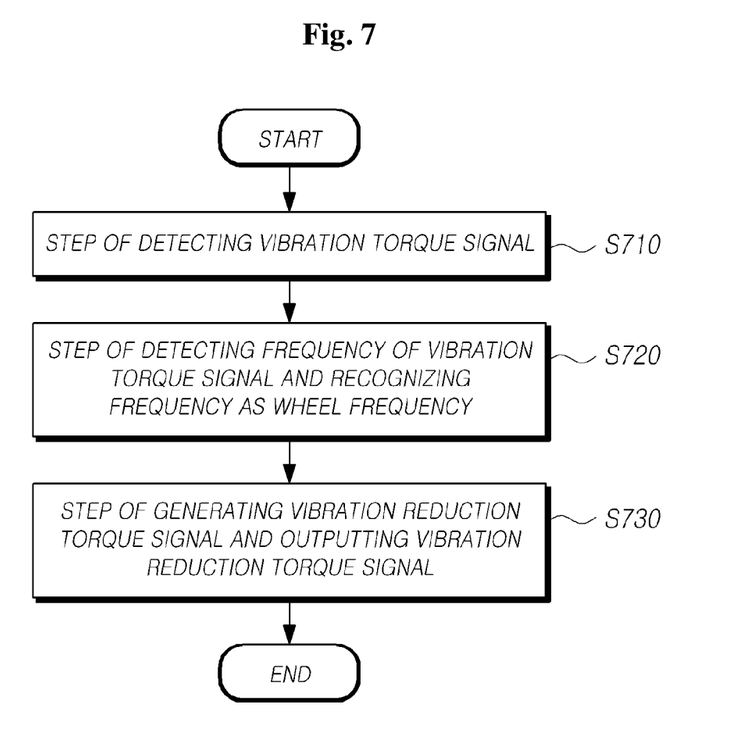
FIG. 7 is a flowchart illustrating a steering wheel vibration reduction method according to the present disclosure.

FIG. 7 is a flowchart illustrating a steering wheel vibration reduction method according to the present disclosure.

Referring to FIG. 7, the steering wheel vibration reduction method according to the present disclosure may include a step (S710) of detecting a vibration torque signal according to a torque generated in accordance with vibrations of the steering wheel among torques generated in the steering wheel, a step (S720) of detecting a frequency of the vibration torque signal and recognizing the frequency as a wheel frequency if the frequency corresponds to the wheel frequency condition set in advance, a step (S730) of generating a vibration reduction torque signal using the wheel frequency and outputting the vibration reduction torque signal to the motor such that a torque reducing the vibrations of the steering wheel is generated by the motor, and the like.

Here, in the step (S710) of detecting a vibration torque signal, a process of passing a vibration torque signal included in a wheel frequency range can be performed using a variable filter receiving an input of a wheel frequency and setting the wheel frequency range based on the wheel frequency.

At this time, as described above with reference to FIG. 2, the variable filter may be a band pass filter, a high pass filter, and the like.

Here, in the step (S720) of recognizing a wheel frequency, a frequency of a vibration torque signal may be detected using two or more times at which the differential value of the vibration torque signal becomes a setting value set in advance.

Although not illustrated in the drawing, the steering wheel vibration reduction method according to the present disclosure may further include a step of receiving an input of information relating to a wheel speed of the vehicle and determining a reference frequency.

At this time, in the step (S720) of recognizing a wheel frequency, a process of receiving an input of a reference frequency, setting a valid frequency range having a predetermined range based on the reference frequency in advance, and recognizing a frequency as the wheel frequency based on whether the frequency is included in the valid frequency range set in advance may be further performed.

Here, in the step (S730) of outputting the vibration reduction torque signal to the motor, a process of receiving an input of the wheel frequency and generating a reference signal and a process of receiving an input of the reference signal and generating a vibration reduction torque signal may be further performed.

Although not illustrated in the drawing, the steering wheel vibration reduction method according to the present disclosure may further include a step of feeding back an error value determined using the vibration torque signal and the vibration reduction torque signal to the vibration reduction torque signal generator.

At this time, in the step (S730) of outputting the vibration reduction torque signal to the motor, a vibration reduction torque signal may be generated until the error value that has been fed back decreases and becomes equal to or smaller than the reference value set in advance.

As described above, according to the present disclosure, a steering wheel vibration reduction apparatus and a steering wheel vibration reduction method capable of minimizing vibrations generated in a steering wheel that change frequently in accordance with external environment factors can be provided.

In addition, according to the present disclosure, a steering wheel vibration reduction apparatus and a steering wheel vibration reduction method that accurately detect vibrations generated in a steering wheel by using a torque generated in the steering wheel and performs efficient control for compensating for the vibrations can be provided.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

REFERENCE SIGNS LIST

100: steering device
110: steering wheel
120: steering column
121: first shaft
122: second shaft
130: torque sensor
140: reaction motor
150: wheel speed sensor
160: steering wheel vibration reduction apparatus
170: drive motor
180: rack bar
190: wheel
210: vibration torque signal detector
220: wheel frequency recognizer
221: variable filter
230: vibration reduction torque signal generator
231: reference signal generator
232: adaptive filter
240: reference frequency determiner
250: feedbacker

What is claimed is:

1. A steering wheel vibration reduction apparatus comprising:
a vibration torque signal detector that detects a vibration torque signal according to a torque generated in accordance with vibrations of a steering wheel;
a wheel frequency recognizer that detects a frequency of the vibration torque signal and, if the frequency corresponds to a wheel frequency condition set in advance and recognizes the frequency as the wheel frequency;
a vibration reduction torque signal generator that generates a vibration reduction torque signal using the wheel frequency and outputs the vibration reduction torque signal to a motor such that a torque for reducing the vibrations of the steering wheel is generated by the motor; and a feedbacker that feeds back an error value determined using the vibration torque signal and the vibration reduction torque signal to the vibration reduction torque signal generator, wherein the vibration reduction torque signal generator generates the vibration reduction torque signal until the error value that has been fed back decreases and becomes equal to or smaller than a reference value set in advance.

2. The steering wheel vibration reduction apparatus according to claim 1, wherein the vibration torque signal detector includes a variable filter that receives an input of the wheel frequency from the wheel frequency recognizer and sets a wheel frequency range based on the wheel frequency, and wherein the variable filter passes the vibration torque signal included in the wheel frequency range.

3. The steering wheel vibration reduction apparatus according to claim 2, wherein the variable filter is a band pass filter, and wherein the wheel frequency range is a frequency range having a predetermined bandwidth with the wheel frequency set as a center frequency.

4. The steering wheel vibration reduction apparatus according to claim 3, wherein the bandwidth increases as the wheel frequency increases, and the bandwidth decreases as the wheel frequency decreases.

5. The steering wheel vibration reduction apparatus according to claim 2, wherein the variable filter is a high pass filter, and wherein the wheel frequency range is a frequency range having the wheel frequency as a cutoff frequency.

6. The steering wheel vibration reduction apparatus according to claim 1, wherein the wheel frequency recognizer detects the frequency using two or more times at which a differential value of the vibration torque signal becomes a setting value set in advance.

7. The steering wheel vibration reduction apparatus according to claim 1, further comprising a reference frequency determiner that receives an input of information relating to a wheel speed of the vehicle and determines a reference frequency, wherein the wheel frequency recognizer receives an input of the reference frequency, sets a valid frequency range having a predetermined range in advance based on the reference frequency, and recognizes the frequency as the wheel frequency based on whether the frequency is included in the valid frequency range set in advance.

8. The steering wheel vibration reduction apparatus according to claim 1, wherein the vibration reduction torque signal generator includes a reference signal generator that receives an input of the wheel frequency and generates a reference signal and an adaptive filter that receives an input of the reference signal and generates the vibration reduction torques signal.

9. The steering wheel vibration reduction apparatus according to claim 8, wherein the adaptive filter receives a feedback of an error value determined using the vibration torque signal and the vibration reduction torque signal and updates coefficients.

10. A steering wheel vibration reduction method comprising:

detecting a vibration torque signal according to a torque generated in accordance with vibrations of a steering wheel;

detecting a frequency of the vibration torque signal and, if the frequency corresponds to a wheel frequency condition set in advance and recognizing the frequency as the wheel frequency;

generating a vibration reduction torque signal using the wheel frequency and outputting the vibration reduction torque signal to a motor such that a torque for reducing the vibrations of the steering wheel is generated by the motor; and feeding back an error value determined using the vibration torque signal and the vibration reduction torque signal to the vibration reduction torque signal generator, wherein, in the outputting of the vibration reduction torque signal to the motor, the vibration reduction torque signal is generated until the error value that has been fed back decreases and becomes equal to or smaller than a reference value set in advance.

11. The steering wheel vibration reduction method according to claim 10, wherein, in the detecting of a vibration torque signal, the vibration torque signal included in a wheel frequency range is passed using a variable filter that receives an input of the wheel frequency and sets the wheel frequency range based on the wheel frequency.

12. The steering wheel vibration reduction method according to claim 11, wherein the variable filter is a band pass filter, and wherein the wheel frequency range is a frequency range having a predetermined bandwidth with the wheel frequency set as a center frequency.

13. The steering wheel vibration reduction method according to claim 12, wherein the bandwidth increases as the wheel frequency increases, and the bandwidth decreases as the wheel frequency decreases.

14. The steering wheel vibration reduction method according to claim 11, wherein the variable filter is a high pass filter, and wherein the wheel frequency range is a frequency range having the wheel frequency as a cutoff frequency.

15. The steering wheel vibration reduction method according to claim 10, wherein, in the recognizing of the frequency as the wheel frequency, the frequency is detected using two or more times at which a differential value of the vibration torque signal becomes a setting value set in advance.

16. The steering wheel vibration reduction method according to claim 10, further comprising receiving an input of information relating to a wheel speed of the vehicle and determining a reference frequency, wherein, in the recognizing of the frequency as the wheel frequency, an input of the reference frequency is received, a valid frequency range having a predetermined range is set in advance based on the reference frequency, and the frequency is recognized as the wheel frequency based on whether the frequency is included in the valid frequency range set in advance.

17. The steering wheel vibration reduction method according to claim 10, wherein, in the outputting of the vibration reduction torque signal to the motor, a process of receiving an input of the wheel frequency and generating a reference signal and a process of receiving an input of the reference signal and generating the vibration reduction torques signal are further performed.

* * * * *